(12) United States Patent
Maurer et al.

(10) Patent No.: US 9,907,712 B2
(45) Date of Patent: *Mar. 6, 2018

(54) POWERED WHEELCHAIR WITH ARTICULATING DRIVE WHEELS

(71) Applicant: Dane Technologies, Inc., Brooklyn Park, MN (US)

(72) Inventors: Balz Maurer, Brunegg (CH); Fabian Wolter, Oberrohrdorf (CH)

(73) Assignee: Dane Technologies, Inc., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,662

(22) Filed: Jul. 17, 2014

(65) Prior Publication Data

US 2014/0326522 A1    Nov. 6, 2014

Related U.S. Application Data

(63) Continuation of application No. 13/623,652, filed on Sep. 20, 2012, now Pat. No. 8,789,632.

(Continued)

(51) Int. Cl.
*A61G 5/06* (2006.01)
*A61G 5/04* (2013.01)
*B60G 17/00* (2006.01)

(52) U.S. Cl.
CPC .............. *A61G 5/042* (2013.01); *A61G 5/041* (2013.01); *A61G 5/043* (2013.01); *A61G 5/045* (2013.01);

(Continued)

(58) Field of Classification Search
CPC .......... A61G 5/06; A61G 5/041; A61G 5/042; A61G 5/043; A61G 5/045; A61G 5/046

(Continued)

(56) References Cited

U.S. PATENT DOCUMENTS 4,926,952 A    5/1990  Farnam
5,690,185 A *  11/1997 Sengel ............... A61G 5/046
                                          180/65.1

(Continued)

FOREIGN PATENT DOCUMENTS

DE         19816879 A1    10/1999
DE      102004005751 A1    8/2004

(Continued)

OTHER PUBLICATIONS

"U.S. Appl. No. 13/623,652, Non Final Office Action dated Oct. 7, 2013", 12 pgs.

(Continued)

*Primary Examiner* — Karen Beck
(74) *Attorney, Agent, or Firm* — Davis, Brown, Koehn, Shors & Roberts, P.C.; Sean D. Solberg

(57) ABSTRACT

A seated vehicle comprises a frame, one or more first wheels at a first position relative to the frame, one or more second wheels at a second position relative to the frame, and a wheel-positioning system. The wheel-positioning system includes one or more arms pivotally coupled to the frame, and an adjustment mechanism operatively coupled to a first position of the one or more arms. The one or more first wheels are operatively coupled to a second position of the one or more arms. The adjustment mechanism moves the one or more arms between a first position and a second position so that the one or more first wheels are in a first position relative to the one or more second wheels when the one or more arms are in the first position and are in a second position relative to the one or more second wheels when the one or more arms are in the second position.

19 Claims, 7 Drawing Sheets

Related U.S. Application Data

(60) Provisional application No. 61/537,040, filed on Sep. 20, 2011.

(52) U.S. Cl.
CPC ............... *A61G 5/046* (2013.01); *A61G 5/06* (2013.01); *B60G 17/00* (2013.01); *B60G 2200/32* (2013.01); *B60G 2300/24* (2013.01)

(58) Field of Classification Search
USPC ............ 280/304, 304.2, 755; 180/22, 24.02, 180/65.1, 907, 908
See application file for complete search history.

(56) References Cited

U.S. PATENT DOCUMENTS

| | | |
|---|---|---|
| 5,772,237 A | 6/1998 | Finch et al. |
| 5,848,658 A | 12/1998 | Pulver |
| 5,904,214 A | 5/1999 | Lin |
| 5,921,338 A | 7/1999 | Edmondson |
| 5,964,473 A | 10/1999 | Degonda et al. |
| 6,047,979 A * | 4/2000 | Kraft ..................... A61G 5/10 280/250.1 |
| 6,129,165 A | 10/2000 | Schaffner et al. |
| 6,341,657 B1 * | 1/2002 | Hopely, Jr. ............ A61G 5/043 180/24.07 |
| 6,494,474 B1 | 12/2002 | Kramer, Jr. |
| 6,691,655 B2 | 2/2004 | Aoyama et al. |
| 6,857,490 B2 * | 2/2005 | Quigg .................... A61G 5/061 180/9.28 |
| 7,264,272 B2 | 9/2007 | Mulhern et al. |
| 7,273,118 B2 | 9/2007 | Huang |
| 7,292,927 B2 | 11/2007 | Yasui et al. |
| 7,316,405 B2 | 1/2008 | Kritman et al. |
| 7,562,728 B1 | 7/2009 | Voigt |
| 7,726,689 B2 | 6/2010 | Mulhern et al. |
| 7,931,300 B2 | 4/2011 | Mulhern et al. |
| 8,172,015 B2 | 5/2012 | Molnar |
| 8,172,016 B2 * | 5/2012 | Goertzen ............... A61G 5/043 180/61 |
| 8,181,992 B2 | 5/2012 | Mulhern et al. |
| 8,272,461 B2 | 9/2012 | Bekoscke et al. |
| 8,789,632 B2 * | 7/2014 | Maurer .................. A61G 5/042 180/24.02 |
| 9,010,470 B2 * | 4/2015 | Cuson ..................... A61G 5/06 180/65.31 |
| 2003/0168264 A1 * | 9/2003 | Goertzen ............... A61G 5/043 180/65.1 |
| 2003/0183427 A1 | 10/2003 | Tojo et al. |
| 2003/0205420 A1 * | 11/2003 | Mulhern ................ A61G 5/043 180/65.1 |
| 2003/0213451 A1 | 11/2003 | Aoyama et al. |
| 2004/0004342 A1 | 1/2004 | Mulhern et al. |
| 2006/0082117 A1 | 4/2006 | Turturiello et al. |
| 2006/0255581 A1 | 11/2006 | Goertzen et al. |
| 2006/0266565 A1 | 11/2006 | Fontecchio et al. |
| 2007/0023209 A1 | 2/2007 | Wu |
| 2007/0152427 A1 | 7/2007 | Olsen |
| 2007/0199743 A1 | 8/2007 | Hsiao |
| 2009/0145677 A1 * | 6/2009 | Zhou ...................... A61G 5/043 180/65.1 |
| 2009/0321162 A1 | 12/2009 | Hunziker et al. |
| 2011/0083913 A1 * | 4/2011 | Cuson ..................... A61G 5/06 180/65.1 |
| 2011/0215540 A1 | 9/2011 | Hunziker et al. |
| 2013/0248261 A1 | 9/2013 | Maurer et al. |

FOREIGN PATENT DOCUMENTS

| | | |
|---|---|---|
| EP | 1154134 A2 | 11/2001 |
| EP | 1363002 A1 | 11/2003 |
| EP | 1522295 A2 | 4/2005 |
| EP | 2332753 A2 | 6/2011 |
| GB | 2325903 A | 12/1998 |
| JP | 59063340 A | 4/1984 |
| JP | 61129429 A | 6/1986 |
| JP | 2000265873 A | 9/2000 |
| JP | 2003328794 A | 11/2003 |
| JP | 2004218522 A | 8/2004 |
| JP | 2004239175 A | 8/2004 |
| JP | 2004278415 A | 10/2004 |
| JP | 2005069131 A | 3/2005 |
| JP | 2007146701 A | 6/2007 |
| RU | 2178528 C2 | 1/2002 |
| RU | 2005114745 A | 1/2006 |
| WO | WO-9849436 A1 | 11/1998 |
| WO | WO-2004042216 A1 | 5/2004 |
| WO | WO-2005051279 A1 | 6/2005 |
| WO | WO-2006136046 A1 | 12/2006 |
| WO | WO-2013041964 A1 | 3/2013 |

OTHER PUBLICATIONS

"U.S. Appl. No. 13/623,652, Notice of Allowance dated Feb. 21, 2014", 5 pgs.

"U.S. Appl. No. 13/623,652, Response filed Jan. 31, 2014 to Non Final Office Action dated Oct. 7, 2013", 11 pgs.

"International Application Serial No. PCT/IB2012/002253, International Preliminary Report on Patentability dated Apr. 3, 2014", 8 pgs.

"International Application Serial No. PCT/IB2012/002253, International Search Report dated Feb. 28, 2013", 4 pgs.

"International Application Serial No. PCT/IB2012/002253, Written Opinion dated Feb. 28, 2013", 6 pgs.

"European Application Serial No. 12806109.0, Examination Notification Art. 94(3) dated Apr. 24, 2015", 5 pgs.

\* cited by examiner

# POWERED WHEELCHAIR WITH ARTICULATING DRIVE WHEELS

CROSS-REFERENCE TO RELATED APPLICATIONS

This patent application is a continuation of U.S. patent application Ser. No. 13/623,652, filed Sep. 20, 2012, now U.S. Pat. No. 8,789,632, which claims the benefit of priority, under 35 U.S.C. § 119(e), to U.S. Provisional Patent Application Ser. No. 61/537,040, filed on Sep. 20, 2011, which are herein incorporated by reference in their entirety.

BACKGROUND

Powered wheelchairs can be built with different configurations. For example, a powered wheelchair can include a front-wheel drive, a rear-wheel drive, or a central-wheel drive. A front-wheel or rear-wheel drive wheelchair can have the advantage of good traction, but can have a large turning radius that can make the wheelchair difficult to be turned in small spaces. A central-wheel drive chair can have the advantage of the wheelchair having a small turning radius, allowing the wheelchair to be turned in a narrow space, but can have poor traction, can have difficulty surmounting obstacles that exceed a certain height, or can have difficulty on varied surfaces, particularly when the wheelchair is travelling slowly.

SUMMARY

This disclosure describes a vehicle, such as a powered or driven wheelchair. The vehicle can include a pair of central wheels that can be motor-driven separately from each other, a pair of front wheels that can also be motor-driven separately from each other, and at least one rear wheel. The vehicle can include a wheel-positioning system for raising and lowering a first set of wheels, such as the front wheels, relative to a second set of wheels such as the central wheels, relative to the frame, or relative to the ground. The wheel-positioning system can provide an opportunity to shift weight of the vehicle and improve traction. It can also allow the ground clearance of the first set of wheels to be adjusted.

In an example, a vehicle comprises a frame, one or more first wheels at a first position relative to the frame, one or more second wheels at a second position relative to the frame, and a wheel-positioning system. The wheel-positioning system includes one or more arms pivotally coupled to the frame, and an adjustment mechanism operatively coupled to a first position of the one or more arms. The one or more first wheels are operatively coupled to a second position of the one or more arms. The adjustment mechanism moves the one or more arms between a first position and a second position so that the one or more first wheels are in a first position relative to the one or more second wheels when the one or more arms are in the first position and are in a second position relative to the one or more second wheels when the one or more arms are in the second position.

In another example, a vehicle comprises a frame, one or more front wheels proximate to a front end of the frame, one or more rear wheels proximate to a rear end of the frame, one or more middle wheels between the front end of the frame and the rear end of the frame, and a wheel-positioning system to adjust a height of a first one of the one or more front wheels, the one or more rear wheels, and the one or more middle wheels relative to a height of a second one of the one or more front wheels, the one or more rear wheels, and the one or more middle wheels. The wheel-positioning system includes one or more arms pivotally coupled to the frame and an adjustment mechanism operatively coupled to a first position of the one or more arms. The first one of the one or more front wheels, the one or more rear wheels, and the one or more middle wheels is operatively coupled to a second position of the one or more arms. The adjustment mechanism moves the one or more arms between a first position and a second position so that the first one of the one or more front wheels, the one or more rear wheels, and the one or more middle wheels is in a first position when the one or more arms are in the first position and a second position when the one or more arms are in the second position.

In yet another example, a seated vehicle comprises a frame carrying a seating system, a plurality of front wheels proximate to a front end of the frame, at least one rear wheel proximate to a rear end of the frame, a plurality of middle wheels between the front wheels and the rear wheels, a drive system for driving the plurality of front wheels and the plurality of middle wheels, wherein the plurality of rear wheels are not driven by the drive system, and a wheel-positioning system to adjust the height of the front wheels relative to at least one of a height of the middle wheels, a height of the rear wheels, the frame, and the ground. The wheel-positioning system includes a plurality of arms pivotally coupled to the frame, wherein one of the plurality of front wheels is operatively coupled to a front end of each of the plurality of arms, and an adjustment mechanism operatively coupled to a rear end of each of the plurality of arms. The adjustment mechanism moves the plurality of arms between a first position and a second position so that the front wheels are in a lowered position when the plurality of arms are in the first position and a raised position when the plurality of arms are in the second position.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

BRIEF DESCRIPTION OF THE DRAWINGS

In the drawings, like numerals can be used to describe similar elements throughout the several views. Like numerals having different letter suffixes can be used to represent different views of similar elements. The drawings illustrate generally, by way of example, but not by way of limitation, various embodiments discussed in the present document.

DETAILED DESCRIPTION

A vehicle is disclosed, and, more particularly, a powered or driven wheelchair with a set of central wheels driven by a drive system, a set of front wheels and at least one rear wheel. The vehicle includes a wheel-positioning system for adjusting a height of a first set of wheels, such as the front wheels, with respect to a second set of wheels, such as the central wheels, or with respect to the frame or the ground. The wheel-positioning system can include one or more arms pivotally coupled to the frame, either directly or indirectly, wherein each arm can be operatively coupled to a corresponding one of the first set of wheels and an adjustment mechanism to raise or lower the point where the arms are coupled to the frame The raising or lowering of the point where the arms are coupled to the frame can, in turn, raise or lower the first set of wheels relative to the second set of wheels, relative to the frame, or relative to the ground.

In an example, a vehicle can include two front wheels that can be motor-driven separately from each other, two central wheels that can be motor-driven separately from each other, and one or more non motor driven rear wheels. The wheel-positioning system can allow the front wheels to articulate upward and downward, e.g., relative to at least one of the central wheels, the frame, and the ground. For example, the front wheels can be moved upward and downward, allowing a user to adjust the height of the front wheels relative to the ground depending on the environment in which the wheelchair is used. In this case, when the raised front wheels strike an obstacle, they can assist the vehicle to surmount the obstacle and continue along its path. The front wheels can also be lowered to a position below the central wheels to ease a transition of the chair moving down from an obstacle, such as a curb. Thus, the drive wheels can be varied to improve traction and ease the chair over obstacles or down to a lower surface. In an example, both the front wheels and the central wheels can be powered or driven, and the vehicle can behave like a four-wheel drive vehicle. Further, because the height of the front wheels can be adjusted, the wheelchair can operate in different environments more effectively.

The example vehicle can also provide the benefits of a central-wheel drive vehicle, e.g., a small turning radius for maneuvering in small spaces, and the benefits of a front-wheel drive vehicle, e.g., better traction in various conditions. The vehicle therefore provides better versatility and variability compared to solely front-wheel drive or solely central-wheel drive vehicles.

Figure 1:
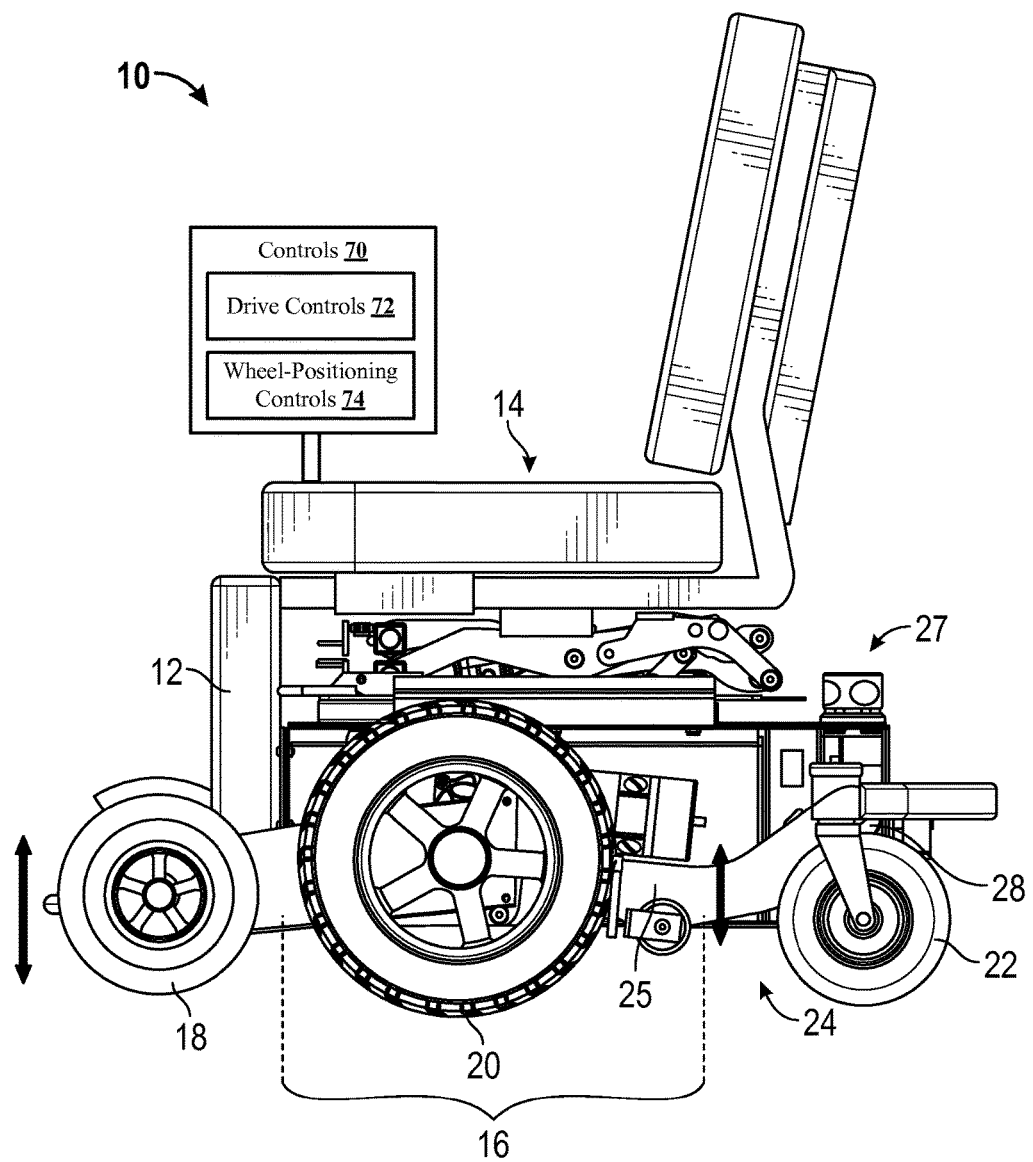
FIG. 1 is a side view of an example powered wheelchair in accordance with the present application.

FIG. 1 is a side view of an example vehicle in accordance with the present application. The vehicle of the present application can comprise a wheelchair 10, such as a powered or driven wheelchair. The wheelchair 10 can include a frame 12, which can carry a seat or seating system 14, a drive system 16 for controlling movement of one or more sets of wheels. In an example, the drive system 16 can control the movement of a set of front wheels 18 and a set of central wheels 20, while a set of rear wheels 22 can be non-powered. Examples of aspects that can be incorporated into the wheelchair 10 are described in the commonly-owned U.S. patent application Ser. No. 12/674,845, entitled "VEHICLE WITH CENTRAL WHEEL DRIVE, IN PARTICULAR A WHEELCHAIR OR STAND-UP WHEELCHAIR," filed on Feb. 23, 2010, the disclosure of which is hereby incorporated by reference herein in its entirety.

As will be discussed in further detail below, the wheelchair 10 can include a wheel-positioning system 24 for raising and lowering one or more first wheels, such as the front wheels 18, relative to one or more second wheels, such as the central wheels 20, or relative to the frame 12, or relative to the ground. The wheel-positioning system 24 can include one or more wheel-positioning arms 25 (only one being shown) that are movable by an adjustment mechanism 27. Each arm 25 can have a corresponding one of the wheels to be articulated, such as one of the front wheels 18, operatively coupled to the arm 25. For example, each of the arms 25 can include a front end 26 on which a corresponding front wheel 18 can be mounted (FIG. 3), and a rear end 28 operatively coupled to the adjustment mechanism 27. The front end 26 and the rear end 28 can pivot about a pivot point 44 mounted to the frame 12 so that the front wheels 18 can be articulated upward and downward relative to the frame 12, relative to another set of wheels, such as the central wheels 20, or relative to the ground.

Each of the central wheels 20 can also be operatively coupled to a corresponding wheel-positioning arm 25. The drive system 16 can also be operatively coupled to one or more of the wheel-positioning arms 25 For example, on each side of the wheelchair 10, both the front wheel 18 and the central wheel 20 can be coupled to the same wheel-positioning arm 25. The front wheel 18 can be operatively coupled to the wheel-positioning arm 25 at the front end 26, while the central wheel 20 can be operatively coupled to the arm 25 between the front end 26 and the rear end 28, such as at about a midway point between the front end 26 and the rear end 28. In an example, shown in FIG. 3, the pivot point 44 can be located in front of and below a central axis of the central wheels 20, such as between the central wheels 20 and the front wheels 18. In such an example, when the wheel-positioning arms 25 pivot about the pivot points 44, the central wheels 20 can articulate relative to the front wheels 18 as part of the overall movement within the suspension system. The extent of the movement of the central wheels 20 can depend on the location of the pivot point 44. In an example, the pivot point 44 can sit about one-third of the way between the front wheels 18 and the rear wheels 20. The closer the pivot point 44 sits to the central axis of the central wheels 20 the less the central wheels 20 will articulate relative to the front wheel 18.

Figure 2:
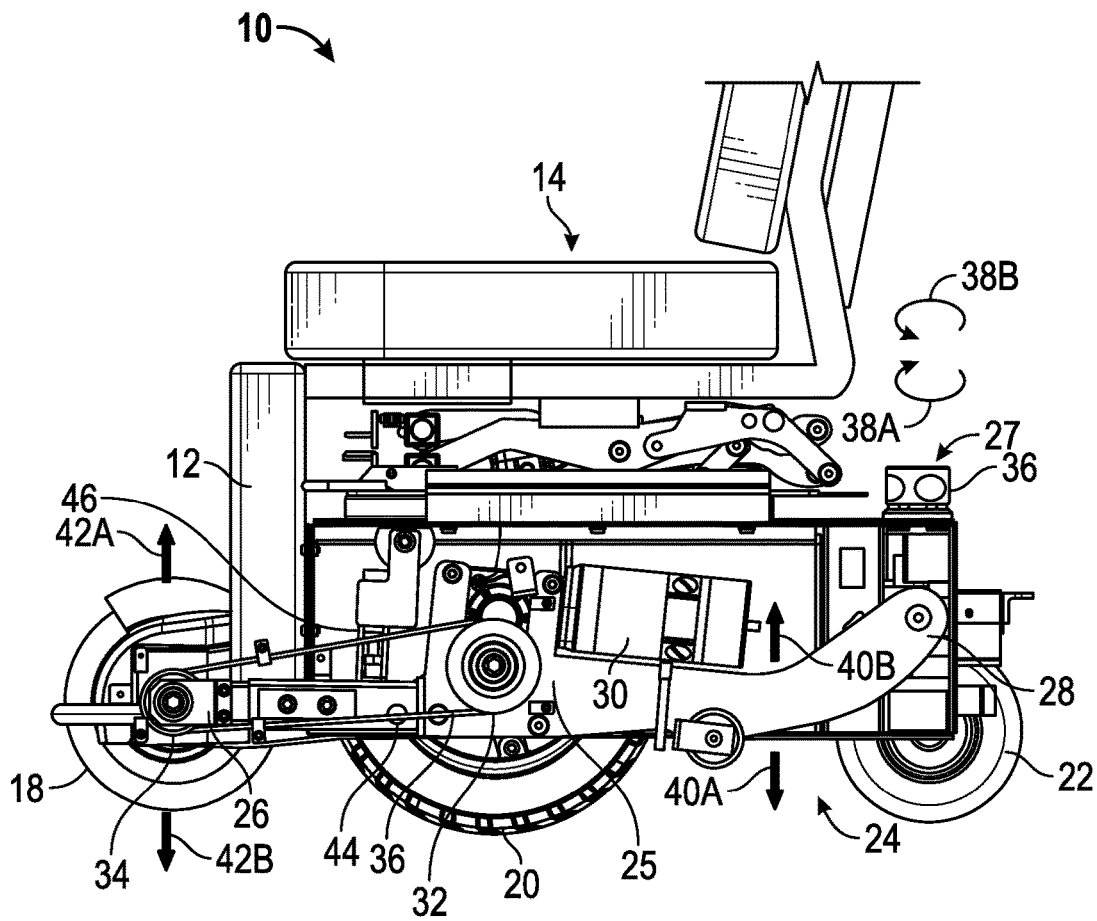
FIG. 2 is a side view of the powered wheelchair of FIG. 1 with several of the wheels removed.

FIG. 2 is a side view of the wheelchair 10 of FIG. 1 with the front wheel 18, the central wheel 20, and the rear wheel 22 on one side of the wheelchair 10 removed to illustrate the operation of an example drive system 16. On each side of the frame 12 (e.g., the right side and the left side of the frame 12), the drive system 16 can include a drive motor device 30, such as a geared motor transaxle, a first pulley 32 operatively coupled to one of the central wheels 20, and a second pulley or a belt or chain system 34 operatively coupled to one of the front wheels 18. An endless drive chain or belt 36 can extend between the first pulley 32 and the second pulley 34. Providing separate drive motors 30 and pulleys 32, 34 can allow the front wheel 18 and the center wheel 20 on a first side of the wheelchair 10 to be driven independently of the front wheel 18 and the center wheel 20 on the opposing second side of the wheelchair 10. As a result, the wheelchair 10 can turn around in narrow spaces. Further, if the wheelchair 10 includes two separate drive motors 30 that each can simultaneously drive a front wheel 18 and a rear wheel 20, the wheelchair 10 can act as a "four wheel drive" vehicle. In one example, the wheelchair 10 can include a common drive train for the front wheels 18 and the central wheels 20 of a given side, while in another example the front wheel 18 and the central wheel 20 on a particular side can be driven independently of one another.

Figure 3:
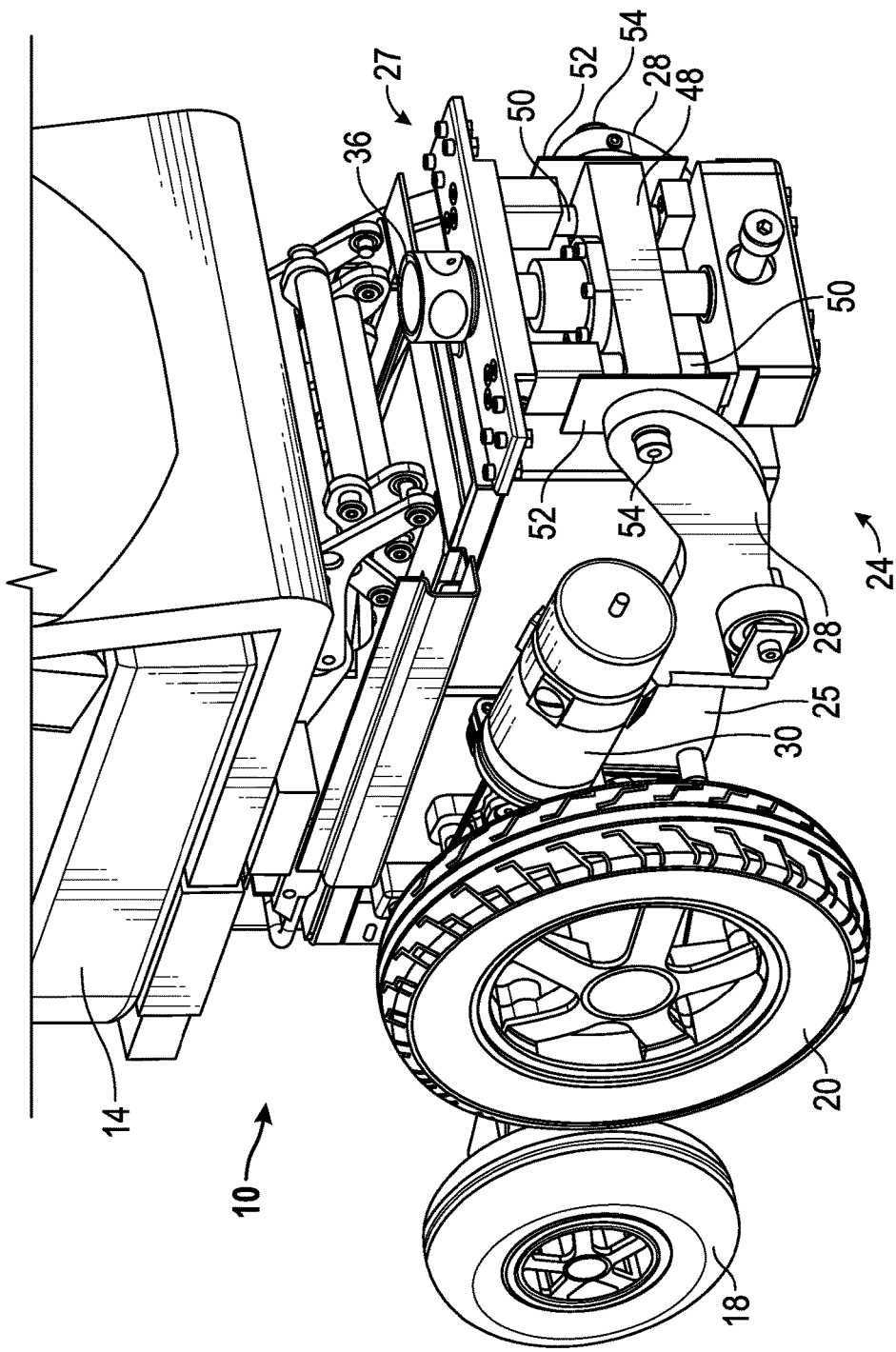
FIG. 3 is a rear perspective view of the powered wheelchair illustrating an example of a wheel-positioning system.

As stated previously, the wheel-positioning system 24 can be operable to control vertical movement of the front wheels 18 relative to the central wheels 20, or relative to the frame 12, or to the ground. A adjustment mechanism 27 can actuate the wheel-positioning arms 25 to move the arms 25 upward or downward as desired. FIG. 3 shows an example of a adjustment mechanism 27. For purposes of illustration, the rear wheels 22 are not shown in FIG. 3. In the example shown in FIG. 3, the adjustment mechanism 27 of the wheel-positioning system 24 can include a rotatable control knob 36 that can control vertical movement of a member 48, such as a generally bar-shaped member 48. The member 48 can be fitted on one or more vertical adjustment tracks or rails 50 that allow for controlled vertical movement of the member 48. The member 48 can be coupled to the one or more wheel-positioning arms 25 so that when the member 48 moves up and down, a portion of the arms 25 also move up and down. In an example, the member 48 can be fixedly coupled to a pair of side plates 52 on each end of the member 48. Each of the wheel-positioning arms 25 can be pivotally coupled to a corresponding side plate 52 or to the member 48, such as via a shaft 54. As the control knob 36 is rotated in one direction, the member 48 can be driven upward by the control knob 36, which in turn drives the second ends 28 of the arms 25 upward. Due to the connection of the arms 25 at the pivot point 44, the upward movement of the second ends 28 of the arms 25 causes the front ends 26 to pivot downward, which in turn moves the front wheels 18 downward as well. Conversely, if the control knob 36 is rotated in the opposite direction, the member 48 can be driven downward, which can drive the rear ends 28 of the arms 25 downward, and the front ends 26 and front wheels 18 can be pivoted upward.

In an example, shown in FIGS. 2 and 3, rotating the knob 36 in a first direction 38A can cause the member 48, and thus the rear ends 28 of the arms 25, to move in a downward direction 40A and the front end 26 of the wheel-positioning arms 25 to move in an upward direction 42A. Conversely, rotating the knob 36 of the wheel-positioning system 24 in a second direction 38B can cause the rear end 28 of the wheel-positioning arms 25 to move in an upward direction 40B and the front end 26 of the wheel-positioning arms 25 to move in a downward direction 42B. As the front wheels 18 are moving in an upward or downward direction relative to the central wheels 20 to the frame 12 or to the ground, the wheel-positioning arms 25 can pivot about a pivot point 44.

In an example, a spring mechanism 46 can be operatively coupled to one or more of the wheel-positioning arms 25 to provide suspension for one or more sets of wheels, such as to the front wheels 18 and central wheels 20 coupled to the arms. One suitable spring mechanism 46 can be a gas spring. The spring mechanism 46 can be configured to bias the arms 25 in a downward direction. In an example, the spring mechanism 46 is operatively coupled to the arm 25 at approximately the same position as the pivot point 44, such as by being operatively coupled directly to the pivot point 44.

The vertical position of the front wheels 18 can be tied directly to the position of the rotatable knob 36. Thus, the front wheels 18 can be moved to any vertical position between predefined minimum and maximum vertical heights (e.g., the front wheels 18 can be infinitely adjustable within a predefined range).

Figure 4A:
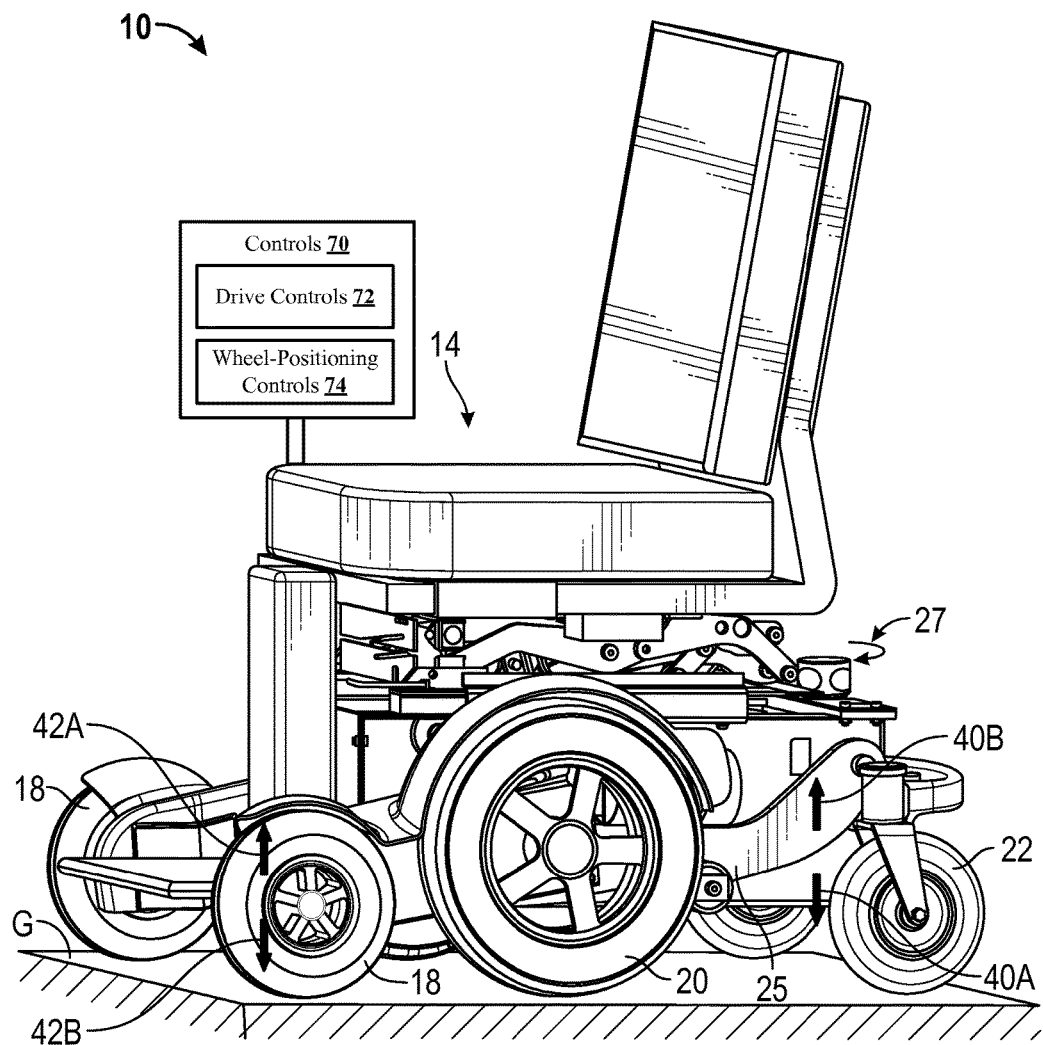
FIGS. 4A and 4B are front perspective views of the powered wheelchair illustrating movement of a pair of front wheels with respect to the ground.
Figure 4B:
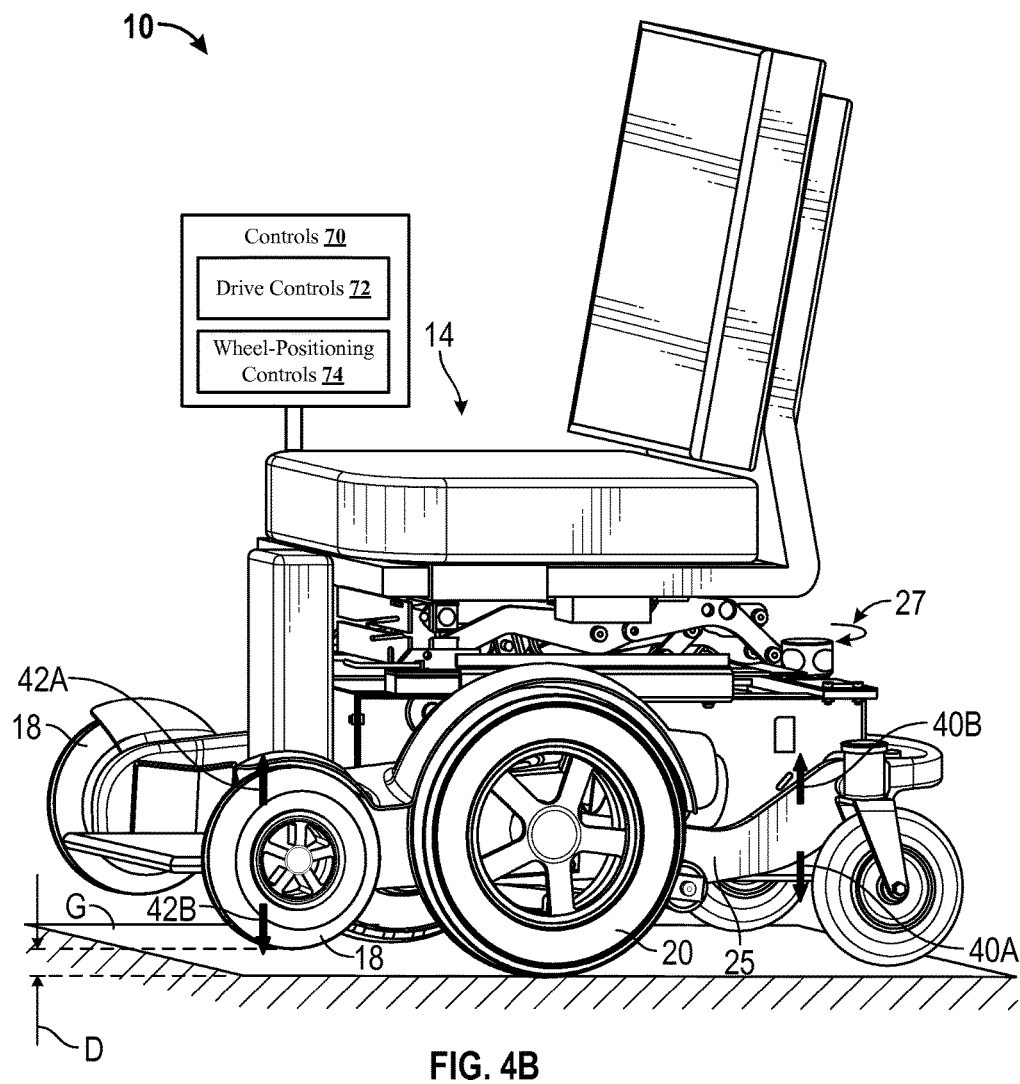

FIG. 4A is a front perspective view of the wheelchair 10 illustrating the front wheels 18 in a first position, also referred to herein as a lowered position, where the front wheels 18 are in contact with the ground G. FIG. 4B is a front perspective view of the wheelchair 10 illustrating the front wheels 18 in a second position, also referred to herein as a raised position, where the front wheels 18 are spaced a distance D from the ground G. In other examples, the positioning system 24 can be set so that the front wheels 18 do not contact the ground even when positioned at the lowest vertical height so that the wheel-positioning system 24 can maintain a minimum distance of the front wheels 18 above the ground G, and the adjustment mechanism 27 can move the front wheels 18 to a position that is higher than the minimum distance.

Figure 5:
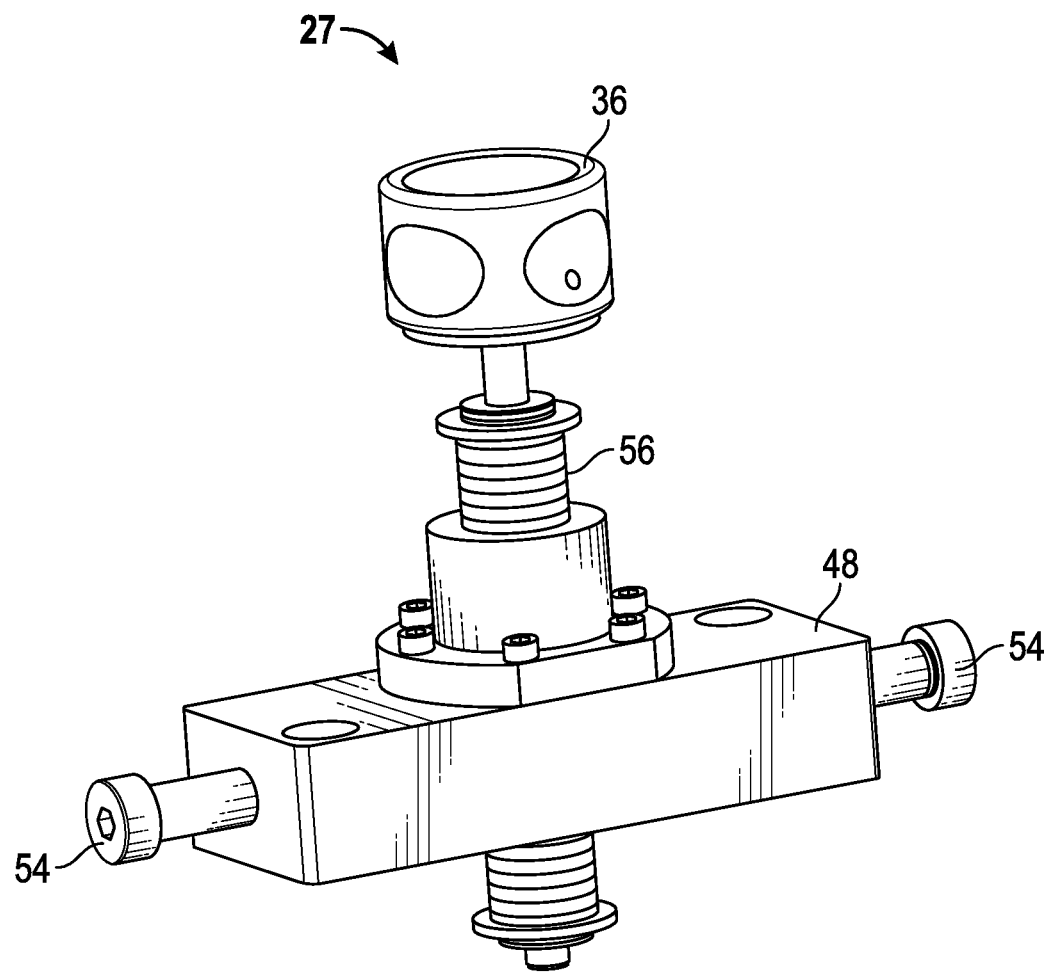
FIG. 5 is a perspective view of the wheel-positioning system isolated from the powered wheelchair.

FIG. 5 is a perspective view of the example adjustment mechanism 27 shown in FIGS. 2, 3, 4A, and 4B isolated from the wheelchair 10. As can be seen in the example of FIG. 5, the knob 36 can be coupled to a threaded shaft 56 that can engage a threaded bore within the member 48 (not shown). As the knob 36 is rotated, the threads of the threaded shaft 56 can engage the threads of the threaded bore to drive the member 48 upward or downward, which in turn can drive the rear end 28 of the arms 25 upward or downward, as described above. The threaded shaft 56, which can be controlled by the control knob 36, can allow the member 48, and hence the rear ends 28 of arms 25 to be positioned variably across a range of positions and stopped at any point in the range, which can provide for variable or infinite adjustment such that the member 48 and the rear ends 28 can be adjusted to substantially any position between a minimum height and a maximum height.

Figure 6:
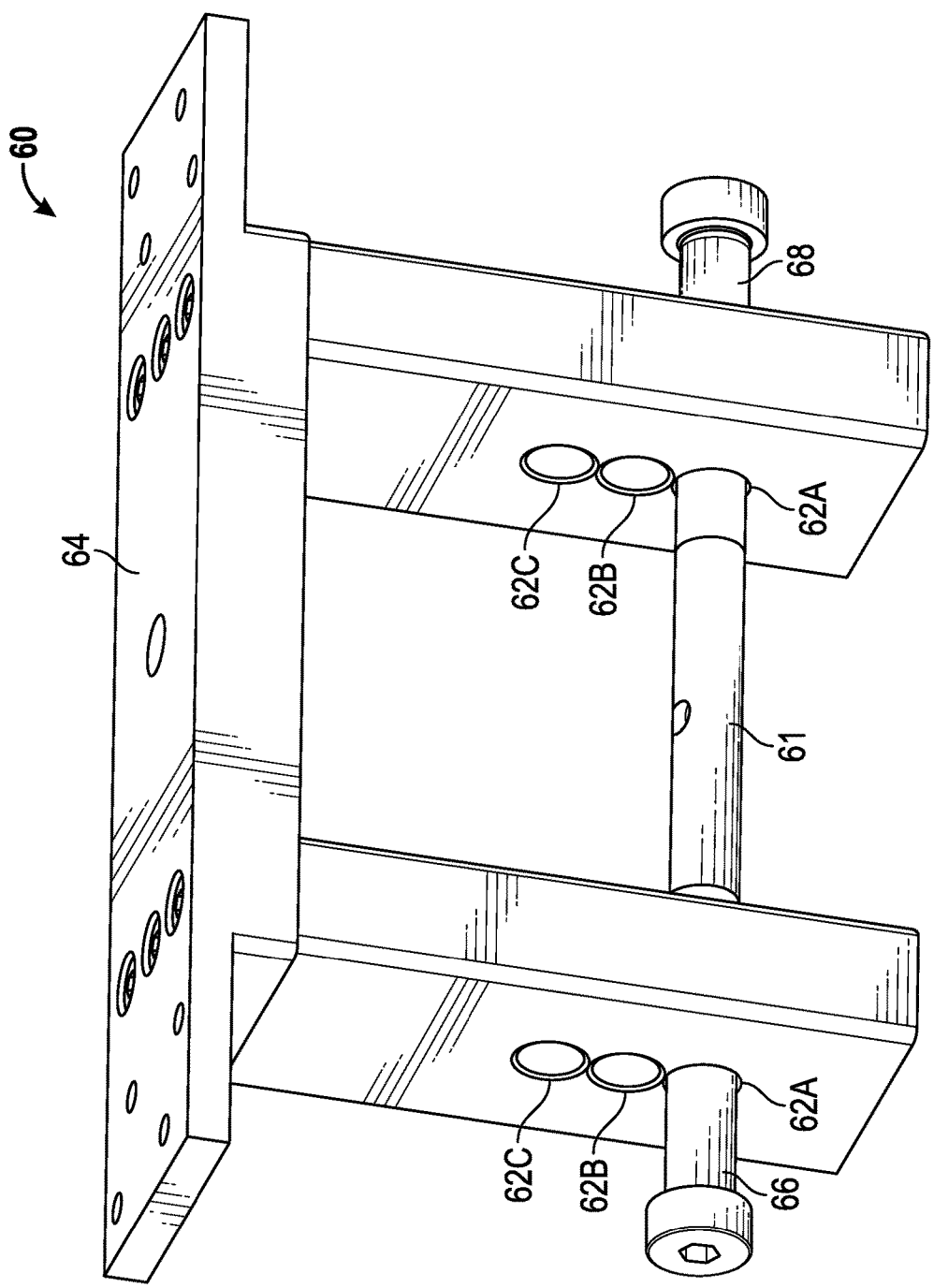
FIG. 6 is a perspective view of another example of a wheel-positioning system in accordance with the present application.

FIG. 6 is a perspective view of another example of a adjustment mechanism 60 that can be used with the wheel-positioning system 24. Unlike the adjustment mechanism 27 described above with respect to FIGS. 2-5, which can be infinitely adjustable, the adjustment mechanism 60 can be structured to move the front wheels 18 between a plurality of discrete vertical positions, e.g., three discrete vertical positions as in the example of FIG. 6. The adjustment mechanism 60 can include a shaft 61 that is manually engageable with one of a first pair of positioning apertures 62A, a second pair of positioning apertures 62B, or a third pair of positioning apertures 62C (collectively referred to herein as "positioning apertures 62" or "pairs of positioning apertures 62") in a frame 64. A first end 66 of the shaft 61 can be configured to engage the rear end 28 of one of the wheel-positioning arms 25, and a second end 68 of the shaft 61 can be configured to engage the rear end 28 of the other wheel-positioning arm 25. The shaft 61 can be inserted through one of the pairs of positioning apertures 62 as well as through a similar aperture at the rear ends 28 of the wheel-positioning arms 25 (not shown). In the example of FIG. 6, the shaft 61 can be inserted through the first pair of positioning apertures 62A in order to position the front wheels 18 at a highest vertical height relative to the central wheels 20. The shaft 61 can be inserted through the third pair of positioning apertures 62C to position the front wheels 18 at a lowest vertical height relative to the central wheels 20. Finally, the shaft 61 can be inserted through the second pair of positioning apertures 62B to position the front wheels 18 at a vertical height that is intermediate to the highest and lowest vertical heights.

FIG. 6 illustrates the adjustment mechanism 60 as having three pairs of positioning apertures 62 merely for purposes of example and not limitation. The adjustment mechanism 60 can include any number of pairs of positioning apertures 62 greater than or equal to two without departing from the intended scope of the present application.

Other examples of wheel-positioning systems can include a motor or other controllable device or mechanism that can control a position of the wheel-positioning arms 25 in order to move the front wheels 18. For example, the wheel-positioning system can include a motor coupled to a threaded shaft (similar to the shaft 56 shown in FIG. 5) that can rotate the shaft in a desired direction. The motor can be in communication, either directly or indirectly, with a switch or other controller 70 that is accessible by a user of the wheelchair 10, such as while the user is sitting in the seat 14 (see, e.g., FIG. 1). In an example, the controller that controls this wheel-positioning motor can also be the same controller that is used to control the drive system 16. For example, the controls 70 can be configured to toggle between drive controls 72 for controlling the drive system 16 and wheel-positioning controls 74 for controlling the wheel-positioning motor. The controls 70, including the drive controls 72 and the wheel-positioning controls 74, are shown conceptually in FIGS. 1, 4A, and 4B. In another example, the controller 74 that controls the wheel-positioning motor can be separate from the controller 72 that controls the drive system 16 so that a user can simultaneously control the drive system 16 and the wheel-positioning motor. This example can allow the user to adjust the position of the front wheels 18 even while the wheelchair 10 is moving, so that the user can adjust wheel position "on the fly," such as when the user approaches an obstacle. The user can also adjust the wheel position at the obstacle using the separate wheel-positioning motor controller. For example, the user can move the front wheels 18 to a raised position relative to the central wheels 20 in order to assist in surmounting a curb or other obstacle. Once the front wheels 18 begin to engage the obstacle, the user can control the wheel-positioning motor to move the front wheels 18 downward to help lift the wheelchair 10 up onto the obstacle. The ability to vary the height of the front wheels 18 can transfer weight to the front wheels 18, enabling better traction and greater ability to overcome an obstacle. The ability to move the front wheels 18 while encountering the obstacle can also reduce the angle between the central wheels 20 and the obstacle. The ability to vary the height of the front wheels 18 can also facilitate or ease the transition from a higher surface to a lower surface, such as when moving from a sidewalk over a curb to the street.

Although any suitable remote control can be utilized, exemplary controllers can include a joystick, pushbuttons, or the like. In an example, the remote control can be operable to drive the member 48 along the pair of vertical rails 50 (see FIG. 3) to move the front wheels 18 in an upward or a downward direction.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A vehicle comprising:
   (a) a frame;
   (b) one or more front wheels proximate to a front end of the frame;
   (c) one or more rear wheels proximate to a rear end of the frame;
   (d) one or more middle wheels between the front end of the frame and the rear end of the frame; and
   (e) a wheel-positioning system to adjust a height of a selected one of the one or more front wheels or the one or more middle wheels relative to a height of at least one of the one or more rear wheels, the frame, or ground upon which the vehicle moves, the wheel-positioning system comprising:
      (i) one or more arms pivotally coupled to the frame, the one or more arms extending from an arm rear end at or proximate to the rear end of the frame toward the front end of the frame, wherein the selected one of the one or more front wheels or the one or more middle wheels are operatively coupled to the one or more arms; and
      (ii) an adjustment mechanism operatively coupled at or proximate to the rear end of the one or more arms, wherein the adjustment mechanism moves the one or more arms between a first position and a second position so that the selected one of the one or more front wheels or the one or more middle wheels move between a first position in contact with the ground when the one or more arms are in the first position and a second position spaced from the ground when the one or more arms are in the second position, wherein the adjustment mechanism comprises a shaft rotatable in a first direction and a second direction, wherein the shaft is operatively connected to the one or more arms so that each of the one or more arms moves toward the first position when the shaft is rotated in the first direction and moves toward the second position when the shaft is rotated in the second direction.

2. The vehicle of claim 1, further comprising a drive system for driving at least one of the one or more front wheels or the one or more middle wheels.

3. The vehicle of claim 2, wherein the drive system includes a first motor configured to drive one or more wheels on a left side of the frame and a second motor configured to drive one or more wheels on a right side of the frame.

4. The vehicle of claim 1, wherein the one or more arms are pivotally coupled to the frame at a pivot point located between the one or more front wheels and the one or more rear wheels.

5. The vehicle of claim 1, further comprising a seating system carried by the frame.

6. A seated vehicle comprising:
(a) a frame carrying a seating system;
(b) first and second front wheels proximate to a front end of the frame;
(c) first and second rear wheels proximate to a rear end of the frame;
(d) first and second middle wheels, wherein the first middle wheel is disposed between the first front wheel and the first rear wheel and the second middle wheel is disposed between the second front wheel and the second rear wheel;
(e) a drive system for driving the first and second front wheels, the drive system comprising at least one drive control accessible by a user sitting on the seating system to control wheel driving; and
(f) a wheel-positioning system to adjust a height of a first one of the first and second front wheels, the first and second middle wheels, and the first and second rear wheels relative to at least one of a height of the frame, the ground, or a second one of the first and second front wheels, the first and second middle wheels, and the first and second rear wheels, the wheel-positioning system comprising:
(i) at least one wheel-positioning control accessible to the user sitting on the seating system, wherein the at least one wheel-positioning control is configured to control the height of the first one of the first and second front wheels, the first and second middle wheels, and the first and second rear wheels relative to the at least one of a height of the frame, the ground, or the second one of the first and second front wheels, the first and second middle wheels, and the first and second rear wheels;
(ii) first and second arms pivotally coupled to the frame, wherein the first one of the first and second front wheels, the first and second rear wheels, and the first and second middle wheels is operatively coupled to the first and second arms at a first location; and
(iii) an adjustment mechanism disposed at or near a rear portion of the frame, wherein the adjustment mechanism is operatively coupled to the first and second arms at a second location,
wherein the adjustment mechanism moves the first and second arms between a first position and a second position so that the first one of the first and second front wheels, the first and second rear wheels, and the first and second middle wheels is in a first position when the first and second arms are in the first position and a second position when the first and second arms are in the second position,
wherein the adjustment mechanism comprises an externally threaded shaft rotatable in a first direction and a second direction, wherein the externally threaded shaft is operatively connected to the first and second arms so that the second location of each of the first and second arms moves downward when the shaft is rotated in the first direction and moves upward when the shaft is rotated in the second direction.

7. The seated vehicle of claim 6, wherein the first and second arms are pivotally coupled to the frame at a pivot point located between the first and second front wheels and the first and second rear wheels.

8. The seated vehicle of claim 6, wherein the drive system includes a first motor configured to drive the first front wheel and a second motor configured to drive the second front wheel.

9. The seated vehicle of claim 6, wherein the at least one wheel-positioning control is configured to control rotation of the shaft.

10. The seated vehicle of claim 6, wherein the at least one wheel-positioning control is located proximate to the at least one drive control.

11. The seated vehicle of claim 6, wherein a common set of controls comprises the at least one drive control and the at least one wheel-positioning control.

12. A vehicle comprising:
(a) a frame;
(b) first and second arms coupled to the frame at a pivotal coupling, wherein the pivotal coupling is disposed between a front end and a rear end of each of the first and second arms, and wherein the first and second arms comprise first and second arm positions;
(c) first and second front wheels operably coupled to the first and second arms at or proximate to the front end of the first and second arms;
(d) first and second rear wheels proximate to a rear end of the frame;
(e) first and second middle wheels operably coupled to the first and second arms between the front end and the rear end of the first and second arms; and
(g) an adjustment mechanism disposed at or near a rear portion of the frame, wherein the adjustment mechanism is operably coupled to the first and second arms, wherein the adjustment mechanism comprises a first adjustment position and a second adjustment position such that movement between the first and second adjustment positions causes movement between the first and second arm positions.

13. The vehicle of claim 12, further comprising a drive system operably coupled to the first and second front wheels.

14. The vehicle of claim 1, wherein the arm rear end moves upward and the arm front end moves downward when each of the one or more arms is moved toward the first position, and wherein the arm rear end moves downward and an arm front end moves upward when each of the one or more arms is moved toward the second position.

15. The vehicle of claim 1, wherein the one or more front wheels and the one or more middle wheels are operatively coupled to the one or more arms.

16. The vehicle of claim 13, wherein the drive system comprises a first motor operably coupled to the first front wheel and a second motor operably coupled to the second front wheel.

17. The vehicle of claim 12, further comprising a seating system carried by the frame.

18. The vehicle of claim 12, wherein movement toward the first arm position causes the first and second front wheels to move upward and the first and second middle wheels to move downward.

19. The vehicle of claim 12, wherein the adjustment mechanism comprises a threaded shaft threadably coupled to a moveable member, wherein the moveable member is operably coupled to the first and second arms.

* * * * *